United States Patent Office 3,660,314
Patented May 2, 1972

3,660,314
POLYETHERS CONTAINING PHOSPHINYL GROUPS
Edwin J. Vandenberg, Wilmington, Del., assignor to Hercules Incorporated, Wilmington, Del.
No Drawing. Filed May 11, 1970, Ser. No. 36,452
Int. Cl. C08g 23/20, 43/02
U.S. Cl. 260—2 A                     11 Claims

ABSTRACT OF THE DISCLOSURE

Polyethers are provided that have phosphinyl groups attached to aliphatic carbons in side chains pendant from the polyether backbone. These phosphinyl containing polyethers are obtained by reacting a polyether containing a haloalkyl group, as for example, poly(epibromohydrin), with an organic phosphite, phosphonite or phosphinite. Said phosphinyl group has the general formula

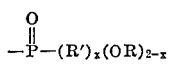

where $x$ is 0 to 2.

---

This invention relates to new phosphorus containing polyethers and more particularly to polyethers having phosphinyl groups in side chains pendant from the main polyether backbone.

It is well known that polyethers can be prepared by the homo- and copolymerization of oxiranes and oxetanes, some of which polyethers contain side chains pendant from the main polymer chain. Typical of such pendant side chains are haloalkyl groups such as chloromethyl, alkoxyalkyl groups such as methoxymethyl groups, alkenyloxyalkyl groups such as allyloxymethyl, and other such side chains.

Now in accordance with this invention, it has been found that polyethers containing phosphinyl groups in the side chains can be prepared by reacting a polyether containing aliphatic halogen with an organic phosphite, phosphonite or phosphinite, whereby the halogen in the polyether is replaced in part, or completely, by phosphinyl groups. Using an epihalohydrin polymer as exemplary, the reaction that takes place with an organic phosphite can be set forth as follows:

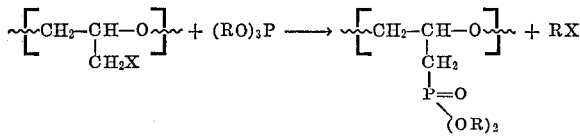

When an organic phosphonite is substituted, the phosphinyl-containing monomer unit would have the formula

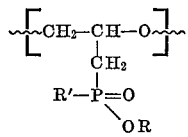

and with an organic phosphinite, the unit would have the formula

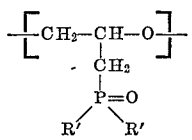

In the case of a cyclic phosphite, as for example, a monocyclic phosphite such as

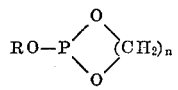

the monomer unit would be

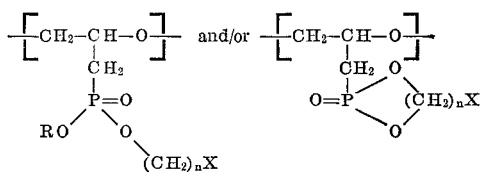

where $n$ is 2 to 4, and with a bicyclic phosphite such as

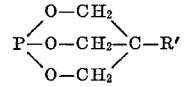

the monomer unit would have the formula

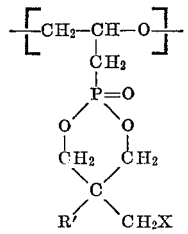

in addition to the above types of phosphinyl groups that can be introduced into the polymer, these groups can be saponified or hydrolyzed, as will be discussed in detail below to yield units containnig

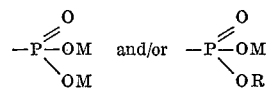

where M is hydrogen or a cation.

The new polyethers of this invention will then have in a side chain pendant from the main polymer backbone, and attached to an aliphatic carbon of said side chain, the group

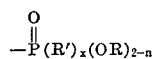

where $x$ is 0 to 2, R' is a hydrocarbon radical, and when $x$ is 1, R is a hydrocarbon radical, which can be like or different from R', and when $x$ is zero, R is H, a hydrocarbon, haloalkyl, or a cation and the R's can be alike or different, or the two R's taken together can be alkylene or cycloalkylene or haloalkyl substituted alkylene or cycloalkylene groups.

The new phosphinyl-containing polyethers of this invention can be prepared from any polyether containing aliphatic halogen. At least about 0.5% and preferably about 1% of the recurring units of such polyethers will be the aliphatic halogen containing unit. More specifically the polyethers will have at least about 0.5% and preferably about 1% of a unit having the formula

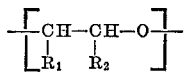

where $R_1$ is hydrogen, alkyl, haloalkyl, haloalkoxyalkyl, aryloxyalkyl, cycloalkyl or aryl, and $R_2$ is haloalkyl or haloalkoxylalkyl, or $R_1$ and $R_2$ together can form an alicyclic ring containing at least one haloalkyl group. The polyether can be crystalline or amorphous and will preferably have a weight average molecular weight of at least about 50,000, equivalent to an RSV of at least about 0.2 and more preferably, an RSV of at least about 0.5. Exemplary of the aliphatic halogen polyethers that can be used to prepare the phosphinyl-containing polyethers are the homopolymers or copolymers with one another or with at least one other oxirane, oxetane, or tetrahydrofuran, of epihalohydrins such as epibromohydrin, epichlorohydrin, and epiiodohydrin, 2-methyl-3-chloropropene-1-oxide,
2-chloroethyl glycidyl ether,
1,1-dichloro-2,3-epoxypropane,
cis- and trans-4-chlorobutene-2-oxide,
cis- and trans-1,4-dichlorobutene-2-oxide,
4-chlorobutene-1-oxide,
3,4-dichlorobutene-1-oxide,
4,4-dichlorobutene-1-oxide,
1,1-bis(chloromethyl)ethylene oxide,
5-chloropenten-1-oxide,
6-bromopentene-1-oxide,
6-bromopentene-2-oxide,
1,6-dichlorohexene-3-oxide,
1-chloromethyl-2,3-epoxycyclohexane,
1,2-bis(chloromethyl)-3,4-epoxycyclohexane,
1-chloro-4-phenoxy-cis-2,3-epoxybutane, etc.

Oxiranes, oxtenanes and tetrahydrofurans which can be copolymerized with one or more of the above halogen containing epoxides and the resulting polyether used in preparing the phosphinyl-containing polyethers are the alkylene oxides containing 2 to 20 carbon atoms or more such as ethylene oxide, propylene oxide, butene-1 oxide, cis- and trans-butene-2 oxide, hexene-2 oxide, dodecene-1 oxide, etc.; the cycloaliphatic epoxides such as cyclohexene oxide, methylcyclohexene oxides, dipentene epoxide, etc.; the phenyl alkylene oxides such as styrene oxide; the glycidyl ethers such as methyl glycidyl ether, ethyl glycidyl ether, butyl glycidyl ether, phenyl glycidyl ether, etc.; the ethlenically unsaturated glycidyl ethers such as allyl glycidyl ether, allylphenyl glycidyl ether, the monoepoxides of dienes such as butadiene, isoprene, etc.; oxetanes such as trimethylene oxide, 2-methyloxtane, 3-methyloxetane, 3,3 - bis(chloromethyl)-oxetane, 3,3 - dimethyloxetane, etc.; tetrahydrofurans such as tetrahydrofuran, 2,3-dimethyltetrahydrofuran, 2,3,4-trimethyltetrahydrofuran, 2,3-diethyltetrahydrofuran, 2,3-diphenyltetrahydrofuran, etc. Especially useful are the homo- and copolymers of the epihalohydrins. Exemplary of suitable polymers that can be used are those described in U.S. Pats. 3,058,922, 3,065,188, 3,158,580, 3,158,581, 3,158,-591, 3,214,390, 3,275,573, 3,285,862, 3,285,870, 3,311,570, 3,341,475 and 3,403,114.

As stated above, the polyethers of this invention containing phosphinyl groups are prepared by reacting an aliphatic halogen-containing polyether with an organic phosphite, an organic phosphonite, or an organic phosphinite. The organic phosphite can be any triester of phosphorous acid, which esters will have the general formula (RO)$_3$P where R is a hydrocarbon radical such as alkyl, cycloalkyl, aralkyl, alkaryl, aryl, etc., and the halo-, cyano- and alkoxycarbonyl substituted derivatives thereof. Typical R groups are methyl, ethyl n-propyl, isopropyl, n-butyl, isobutyl, tert-butyl, n-octyl, isooctyl, dodecyl, stearyl, 2-chloroethyl, 2-bromoethyl, 4-bromobutyl, 2,2,2-trichloroethyl, 2,2,2-tribromoethyl, 4,4,4-tribromobutyl, 2-cyanoethyl, phenyl, chlorophenyl, dichlorophenyl, bromophenyl, dibromophenyl, tribromophenyl, cyanophenyl, methoxycarbonylphenyl, naphthyl, chloronaphthyl, bromonaphthyl, tolyl, cumenyl, xylyl, cyclopentyl, cyclohexyl, methylcyclohexyl, dimethcyclohexyl, menthyl, phenylcyclohexyl, chlorocyclohexyl, bromocyclohexyl, benzyl, phenethyl, bromobenzyl, etc. The R's can be alike or different or two or all three can form a cyclic ring. Exemplary of these are monocyclic phosphites such as methyl ethylene phosphite, methyl 1,3-propylene phosphite, ethyl cyclohexylene phosphite, phenyl ethylene phosphite, etc. and bicyclic posphites such as the phosphite ester of trimethylol propane. Organic phosphonites and organic phosphinites, which can be used have the formulae (RO)$_2$PR' and (RO)P(R')$_2$, respectively, where R and R' are hydrocarbon groups as defined above, which again can be alike or different. Exemplary of these are trimethyl phosphonite, diethyl methyl phosphonite, triethyl phosphonite, methyl diphenyl phosphonite, dimethyl phenyl phosphonite, methyl bis(bromophenyl) phosphonite, diethyl cyclohexyl phosphonite, tricyclohexyl phosphonite, etc., and trimethyl phosphinite, methyl diethyl phospinite, triisopropyl posphinite, methyl cyclohexyl phosphinite, ethyl diphenyl phosphinite, etc. Preferred phosphorus compounds are those of the above formulae where at least one R is alkyl and primary and secondary alkyls are the most preferred.

The amount of the phosphite, phosphonite or phosphinite reacted with the polyether can vary from the amount theoretically required to obtain the desired substitution up to a large excess. In general it will be from about 0.3% of the stoichiometric amount up to a many fold excess, e.g., 500% or more of the stoichiometric amount.

The reaction between the halogen-containing polyether and the organic phosphorus compound can be carried out by mixing the polymer and the phosphorus compound in the presence or absence of a diluent which can be a solvent or not for one or both of the reactants and heating the mixture until the desired degree of reaction is attained. Diluents that can be utilized are solvents such as dimethyl sulfoxide, dimethyl formamide, dimethyl acetamide, N-methyl pyrrolidone, tetrahydrofuran, dioxane, acetone, benzene, toluene, chlorobenzene, etc. and mixtures of such solvents. Nonsolvent diluents such as aliphatic hydrocarbons can be used alone or in combination with solvents, if the polymer and phosphite are dispersed therein. In some cases a large excess of the phosphorus compound can be used as the diluent for the reaction.

The temperature at which the reaction will be carried out is largely dependent on the particular phosphorus compound and polymer being reacted. In general, the temperature will be within the range of from about 30° to about 275° C. and preferably from about 50° to about 250° C., for a period of from several minutes to hours.

The by-product organohalide when formed in the reaction is preferably removed from the reaction zone during the reaction so as to obtain the most efficient use of the phosphorus compound. One method of removing the by-product is to select conditions, e.g. temperature and pressure, so that the temperature of the reaction mixture is below the boiling point of the phosphite being used but above the boiling point of the organohalide formed. By this means the organohalide is volatilized and removed from the reaction mixture. Unreacted phosphite, phosphonite or phosphinite can also be removed during the reaction, separated from the organohalide, and then returned to the reaction zone. The process can be operated as a continuous or a batch reaction.

The method by which the phosphinyl polyether product is recovered will depend on the process used for preparing the polymer. Thus if the reaction is carried out in the presence of a diluent, which is a nonsolvent for the product, the latter can be separated by simple filtration, centrifugation, etc. If the diluent used is a solvent for the product, the solvent and unreacted phosphite can be stripped off at an appropriate temperature under vacuum, the polymer product can be steam coagulated and the solvents stripped off or the polymer product can be precipitated by the addition of a nonsolvent for the polymer but which is miscible with the reaction medium, preferably one that is a solvent for the unreacted phosphite. The product can finally be dried under any appropriate conditions of temperature, pressure, and time under which is is stable, and preferably is dried at a temperature lower than the reaction temperature.

The nature of the phosphinyl polyethers of this invention can vary widely depending on the nature of the starting polymer, as for example, whether it was crystalline, amorphous, rubbery, water-soluble or water-insoluble, etc., as well as on the amount of phosphonate groups present in the product. They will have a weight average molecular weight of at least about 50,000, equivalent to an RSV of at least about 0.2 as measured on a 0.1% solution in tetrachloroethane at 25° C., and at least about 0.5% and preferably at least 1% up to 100% of the monomer units in the polyether product will contain phosphinyl groups in the side chains.

The following examples will illustrate the preparation of the new polyethers containing phosphinyl groups in the side chains. All parts and percentages are by weight unless otherwise indicated. By the term reduced specific viscosity (RSV) is meant the specific viscosity divided by concentration as determined on a solution of the polymer in a suitable solvent.

EXAMPLE 1

A solution of 5 parts of an amorphous poly(epibromohydrin) having an RSV of 0.27 (0.1% solution in tetrachloroethane at 25° C.) in 108 parts of dry toluene was prepared by tumbling overnight at 95° C. in a pressure vessel under an atmosphere of nitrogen. Then, 4.51 parts (100% of the stoichiometric amount) of trimethylphosphite, $(CH_3O)_3P$, was added and the reaction mixture was heated during one hour to 160° C. and held at that temperature for 24 hours.

The reaction solution was cooled to room temperature. It was soluble in methanol and isopropyl alcohol. On addition of 10–20 volumes of n-heptane, a fine sticky precipitate was formed. This heptane insoluble product (4.5 parts) was recovered, washed with heptane and dried for 16 hours at 80° C. under vacuum. On analysis this product was found to contain 3.5% phosphorus and 35.77% bromine, indicating at least 16% replacement of bromine by dimethoxyphosphinyl groups which corresponds to 16.9% by weight of the monomer unit, i.e.,

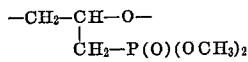

The polymer was a very soft, tacky, tan rubber.

This heptane-insoluble polymer was insoluble, but swollen in acetone, dimethylformamide, dimethylsulfoxide, tetrahydrofuran, hexamethylphosphoric triamide, chloroform, methanol, toluene, diethyl ether and tetrachloroethane. It was insoluble in water and in aqueous 2% sodium carbonate solution but was soluble in aqueous 2% sodium hydroxide solution giving the sodium phosphonate derivative.

On evaporating the solvent from the n-heptane solution remaining after separation of the heptane-insoluble polymer, there was obtained a small amount of heptane-soluble polymer, which on analysis was found to contain 17.0% bromine.

EXAMPLE 2

Example 1 was repeated except that the reaction mixture was heated at 170° C. instead of 160° C. Analysis of the heptane-insoluble polymer so obtained showed it to contain 4.05% of phosphorus and 38.37% bromine, indicating 19% substitution of bromine by $$[P(O)(OCH_3)_2]$$

i.e. 19.7% by weight of the phosphinyl monomer unit in the polymer.

EXAMPLE 3

Five parts of amorphous poly(epibromohydrin) having an RSV of 0.27 was dissolved in 39.5 parts of acetone at 50° C. under nitrogen in a pressure vessel and 4.95 parts (110% of the stoichiometric amount) of trimethylphosphite was added. After removing all but 4 parts of acetone, the reaction mixture, which was a solution, was heated at 160° C. for 1 hour, cooled to room temperature, vented and again heated at 160° C. for 23 hours. There was obtained 4.35 parts of a hard brittle, clear brown solid which was purified by tumbling in toluene at 65° C. for 3 days, separated by centrifugation, again tumbled in toluene for 1 day, again separated and then dried for 16 hours at 80° C. under vacuum. The polymer product so obtained on analysis was found to contain 13.0% phosphorus and 10.4% bromine indicating that 66% of the bromine had been replaced by the dimethoxyphosphinyl group, i.e. about 63% by weight of the phosphinyl monomer unit in the polymer.

EXAMPLE 4

A pressure vessel was charged under nitrogen with 5 parts of an amorphous poly(epichlorohydrin) having an RSV of 1.8 (0.1% solution in α-chloronaphthalene at 100° C.) and containing 0.5% of a phenolic antioxidant as stabilizer and 6.66 parts (100% of the stoichiometric amount) of trimethylphosphite. The polymer completely absorbed the phosphite. The mixture was then heated for 24 hours at 160° C. There was obtained 5.84 parts of a clear, almost water-white soft gel. The product was purified by treatment with toluene as described in Example 3. On analysis the polymer was found to contain 6.9% phosphorus and 24.7% chlorine indicating that 24.8% substitution of chlorine by dimethoxyphosphinyl (33.4% by weight of the phosphinyl monomer unit in the polymer) had been obtained.

EXAMPLE 5

Two parts of an amorphous poly(epibromohydrin) having an RSV of 0.23 (0.1% solution in tetrachloroethane at 25° C.) was dissolved in 1.8 parts of trimethylphosphite (100% of the stoichiometric amount) under nitrogen in a pressure vessel. The mixture was heated at 95° C. for 28 hours, then was heated during 1 hour to 160° C. and was held at that temperature for 1 hour. There was then added 13 parts of toluene and the mixture was tumbled overnight at 65° C. On recovery of the polymer product there was obtained both a toluene-soluble fraction and a toluene-insoluble fraction. The latter was then extracted with acetone whereby there was obtained an acetone-soluble fraction and an acetone-insoluble fraction. All three fractions were soft rubbers. Analysis of each gave the following results:

| Product | Percent P | Percent Br | Percent substitution obtained | Percent dimethoxy-phosphinyl monomer unit |
|---|---|---|---|---|
| Toluene-soluble | 2.5 | 48.7 | 11.1 | 12.1 |
| Acetone-soluble, toluene-insoluble | 3.0 | 47.9 | 12.8 | 14.5 |
| Acetone-insoluble, toluene-insoluble | 2.4 | 49.0 | 10.8 | 11.6 |

EXAMPLE 6

Five parts of an amorphous poly(epibromohydrin) having an RSV of 0.27 (0.1% in tetrachloroethane at 25° C.) was dissolved in 106.5 parts of a hydrocarbon mixture with a high aromatic content and boiling point range of 155°–173° C. To the solution was added 7.56 parts of triisopropylphosphite (the stoichiometric amount) and the mixture was heated at reflux temperature under a blanket of nitrogen for 7 hours. The product was precipitated from the solution by the addition of 8 volumes of cyclohexane. The precipitate was separated, washed with cyclohexane then with cyclohexane containing 0.05% of a phenolic antioxidant, and dried at 80° C. for 16 hours under vacuum. There was obtained 4.32 parts of a soft, rubber having an RSV of 0.28 (0.1% solution in tetrachloroethane at 25° C.). It was soluble in acetone, benzene and toluene. Analysis showed it to contain 2.9% phosphorus and 44.6% bromine indicating 13.9% of the bromine had been substituted by $-P(O)(OC_3H_7)_2$ groups, representing 19.2% (by weight) of the phosphinyl monomer units, i.e.

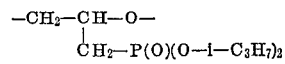

EXAMPLE 7

Ten parts of an amorphous poly(epichlorohydrin) having an RSV of 1.6 (0.1% in α-chloronaphthalene at 100° C.) was dissolved in 42.6 parts of the same hydrocarbon mixture used in Example 6. To the solution was added 22.3 parts of triisopropylphosphite (the stoichiometric amount) and the mixture was heated at reflux for 2 hours. The polymer product was recovered as described in Example 6. There was obtained 9.5 parts of a tough rubber having an RSV of 2.4 (0.1% solution in tetrachloroethane at 25° C.). It was soluble in acetone, benzene, and tetrachloroethane. Analysis showed it to contain 0.5% phosphorus and 35.8% chlorine indicating that 1.5% of the chlorine had been substituted by diisopropyloxyphosphinyl groups. Hence, the polymer contained 3.4% of the phosphinyl monomer units.

EXAMPLE 8

Ten parts of an amorphous poly(epichlorohydrin) was added to 22.3 parts of triisopropylphosphite (the stoichiometric amount) and the mixture was heated gradually with stirring to reflux temperature (150° C.) and held at that temperature for 6 hours. After cooling to room temperature, 16 parts of acetone was added. The mixture was allowed to stand for 16 hours, then reheated gradually to reflux in a constant temperature bath (150° C.) while allowing the acetone to distill off. The mixture was held at the reflux temperature for an additional 24 hours, after which 80 parts of acetone containing 0.003 part of a phenolic antioxidant was added. The acetone-insoluble polymer was collected. The acetone-soluble polymer was recovered from the filtrate and amounted to 0.7 part. The acetone-insoluble polymer was added to 175 parts of toluene. The toluene-insoluble fraction was collected and amounted to 5.2 parts. This acetone and toluene-insoluble polymer was also insoluble in tetrachloroethane. The acetone-insoluble, toluene-soluble fraction was recovered from the toluene solution by precipitation with 5 volumes of cyclohexane. It amounted to 4.3 parts and had an RSV of 1.36 (0.1% solution in tetrachloroethane at 25° C.). All of the isolated products were dried for 16 hours at 80° C. under vacuum. Tabulated below is the analysis and percent substitution for each polymer.

| Product | Percent P | Percent Cl | Percent substitution obtained | Percent diisopropoxy phosphinyl monomer unit |
|---|---|---|---|---|
| Acetone-soluble | 3.3 | 28.6 | 11.5 | 22.0 |
| Acetone-insoluble, toluene-soluble | 3.8 | 28.0 | 13.6 | 25.2 |
| Acetone-insoluble, toluene-insoluble | 4.4 | 27.8 | 16.3 | 29.2 |

EXAMPLE 9

The procedure of Example 6 was repeated except that 12.0 parts of tricyclohexyl phosphite (the stoichiometric amount) was used in place of the triisopropyl phosphite used in that example. The product was precipitated from the reaction solution by the addition of methanol. The polymer was collected and washed with methanol containing 0.1% of a phenolic antioxidant. After drying for 16 hours at 80° C. under vacuum, it amounted to 5.1 parts. It was a rubbery solid, soluble in acetone and benzene, and had an RSV of 0.35 (0.1% solution in tetrachloroethane at 25° C.). Phosphorus analysis indicated that 18% of the bromine had been substituted and that the polymer contained 35% of the dicyclohexyloxy phosphinyl monomer units, i.e.

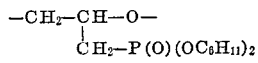

EXAMPLE 10

Example 9 was repeated except that 10.3 parts of bis (2,4-dibromophenyl) methyl phosphite (50% of the stoichiometric amount) was substituted for the tricyclohexyl phosphite used in that example and only 10 parts of the aromatic hydrocarbon diluent was used. The solid polymer so obtained had an RSV of 0.30 (0.1% solution in tetrachloroethane at 25° C.) and analysis showed it to contain 40% of the

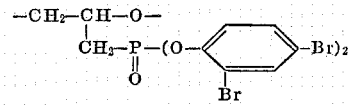

units.

EXAMPLE 11

The procedure of Example 6 was repeated using 5.5 parts, the stoichiometric amount, of triethyl phosphonite, i.e. $(C_2H_5O)_2PC_2H_5$. After 3 hours reaction, the polymer was precipitated and dried. There was obtained 4.8 parts of a rubbery solid having an RSV of 0.32 (0.1% solution in tetrachloroethane at 25° C.). Based on phosphorus analysis it contained 20% of the

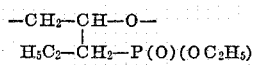

monomer units.

EXAMPLE 12

The procedure of Example 7 was repeated except that 14.5 parts, the stoichiometric amount, of triethyl phosphinite, i.e. $(C_2H_5)_2P-O-C_2H_5$ was used in place of the triisopropyl phosphite used in that example. After heating at reflux temperature for 4 hours, the product was recovered. It amounted to 9.9 parts and was a rubbery solid having an RSV of 2.0 (0.1% solution in tetrachloroethane at 25° C.). Phosphorus analysis indicated tertiary phosphine oxide groups equivalent to 15% of the

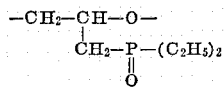

monomer units.

This product had improved adhesion to metals over the unmodified polymer and was an effective agent for complexing metals, including uranium.

EXAMPLE 13

Nine parts of an amorphous 1:1 molar epichlorohydrin-ethylene oxide copolymer (68% epichlorohydrin) having an RSV of 3.8 (0.1% in α-chloronaphthalene at 100° C.) and containing 0.3% of a phenolic antioxidant, was added to 13.7 parts of triisopropylphosphite (the stoichiometric amount), and the mixture was heated to reflux temperature (150° C.) and held at that temperature for 23 hours. After cooling to 95° C. there was added 21.8 parts of toluene and the mixture was allowed to stand for 16 hours. The mixture was then added to 175 parts of toluene and warmed gently with stirring. The toluene-insoluble product was collected, dissolved in acetone and reprecipitated by adding 5 volumes of methanol. It was a rubber, amounted to 0.24 part and had an RSV of 3.4 (0.1% solution in tetrachloroethane at 25° C.). On analysis it was found to contain 2.4% phosphorus and 23.6% chlorine indicating the presence of 6.6% of the diisopropoxy phosphinyl monomer units. The toluene-soluble polymer was recovered by adding 0.2 part of a phenolic antioxidant and evaporating the diluents. The residue was redissolved in acetone, the polymer precipitated by the addition of methanol and then dried. The toluene-soluble polymer so obtained was a rubber, amounted to 5.45 parts, and had an RSV of 2.6 (0.1% solution in tetrachloroethane at 25° C.). Analysis for phosphorus and chlorine showed that the percent substitution was 11.8 and hence the polymer contained 17.2% of the diisopropoxy phosphinyl monomer units.

EXAMPLE 14

The procedure of Example 6 was repeated using only one-fifth the amount of diluent used in that example and refluxing the reaction mixture for 2 hours. There was recovered 4.2 parts of a soft, tacky rubber which had an RSV of 0.29 (0.1% solution in tetrachloroethane at 25° C.). Analysis for phosphorus and bromine showed the polymer to contain 30% of the diisopropoxy phosphinyl monomer units.

EXAMPLE 15

Ten parts of an amorphous poly(2-chloroethyl glycidyl ether) having an RSV of 2.0 (0.1% solution in tetrachloroethane at 25° C.) was dissolved in 42.6 parts of the hydrocarbon diluent used in Example 6. To the solution was added 33.0 parts of triisopropyl phosphite (the stoichiometric amount) and the mixture was heated at reflux for 2 hours. The polymer product was recovered as in Example 6. It was a tough rubber amounting to 10.5 parts and had an RSV of 1.5 (0.1% solution in tetrachloroethane at 25° C.). Phosphorus analysis showed that the product contained 4.1% of the

monomer units.

EXAMPLE 16

The procedure of Example 15 was repeated using 10 parts of a crystalline, isotactic poly(epichlorohydrin) having an RSV of 3.5 (0.1% solution in α-chloronaphthalene at 100° C.). The reaction mixture was refluxed for one hour. There was recovered 11.0 parts of a tough, hard, partly crystalline solid having an RSV of 2.0 (0.1% solution in tetrachloroethane at 100° C.). Phosphorus analysis showed that the polymer contained 2.2% of the

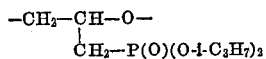

monomer units.

EXAMPLE 17

The procedure of Example 7 was repeated using 21.0 parts of phenyl ethylene phosphite

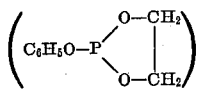

in place of the triisopropyl phosphite used in that example. The reaction mixture was refluxed for 1.0 hour. There was recovered 9.5 parts of a strong rubber having an RSV of 1.8 (0.1% solution in tetrachloroethane at 25° C.). Phosphorus analysis showed the polymer contained 8.5% of the

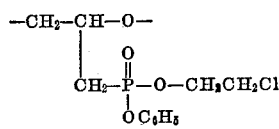

monomer units.

EXAMPLE 18

The procedure of Example 7 was repeated using 17.5 parts of trimethylol propane phosphite

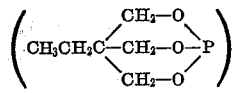

and the reaction mixture was refluxed for 8 hours. There was recovered 9.3 parts of a tough rubber having an RSV of 2.0 (0.1% solution in tetrachloroethane at 25° C.). Phosphorus analysis indicated that the polymer contained 3.3% of the

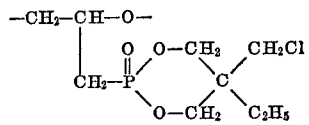

monomer units.

EXAMPLE 19

To 1.0 part of the polyether containing dimethoxyphosphinyl groups produced in Example 4 was added 1.68 parts of 10% aqueous sodium hydroxide (two equivalents per phosphorus) and 8.2 parts of water. The mixture was tumbled in a pressure vessel under nitrogen at 65° C. for 16 hours, an equal volume of tetrahydrofuran was added, the mixture tumbled for 24 hours at 65° C. and again tetrahydrofuran was added (1.5 times the volume) and the mixture was tumbled for 83 hours at 65° C. The insoluble material was removed by filtration and the filtrate was dialyzed against distilled water for 24 hours in a continuous unit. The dialyzate was freeze-dried whereby 0.46 part of a tacky rubber was recovered which was soluble in water and tetrahydrofuran. It had an RSV of 1.0 (0.1% solution in dimethylformamide at 25° C.). It was analyzed for phosphorus, sodium and chlorine (no chlorine lost). The amount of phosphorus and sodium found showed that the polymer contained 18% of the monomer unit

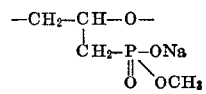

EXAMPLE 20

The procedure of Example 1 was repeated using an amorphous poly(epibromohydrin) having an RSV of 0.32 (0.1% solution in α-chloronaphthalene containing 3% acetylacetone at 100° C.). The heptane-insoluble polymer so obtained was a white, moderately hard rubber. Analysis showed it to contain 4.4% phosphorus and 43% bromine, which corresponds to 23.6% of the monomer unit containing the dimethoxyphosphinyl groups.

One part of this polymer containing dimethoxyphosphinyl groups was saponified by the procedure described in Example 19, using 1.14 parts of 10% aqueous sodium hydroxide (2 equivalents per phosphorus) and 8.8 parts of water. The product obtained by freeze-drying was a tacky rubber, amounting to 0.51 part. On analysis for sodium, phosphorus and bromine the polymer was found to contain 10.4% the monomer unit containing the

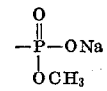

group and 5.3% of the unsaponified

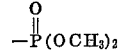

group. It had an RSV of 0.11 as measured on a 0.1% solution in dimethylformamide.

The polyethers of this invention containing phosphinyl groups in the pendant side chains have many uses. They are readily cross-linked by heating and in fact, care must be taken to avoid premature cross-linking in preparing the phosphinyl polymers, as may be seen from the foregoing examples where, as for example in Examples 1 and 5, an insoluble product was obtained. It is believed that this cross-linking reaction takes place by the following mechanism:

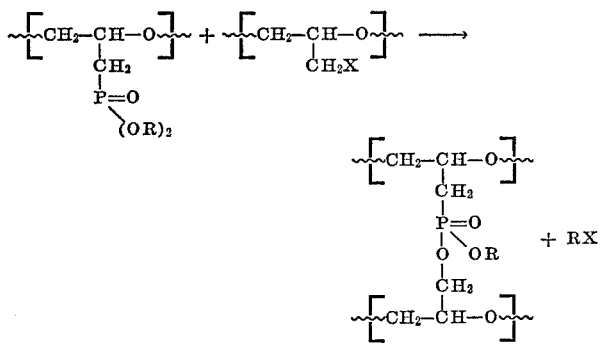

The polyether phosphinyls of this invention, if prepared under conditions where the product is not cross-linked or only partly cross-linked, can be cross-linked, or further cross-linked, by heating in bulk, in suspension in a diluent, or in solution at a temperature of from about 100° to about 275° C., preferably about 125° to about 250° C. for from minutes to hours depending on the nature of the polymer, the phosphinyl group involved, and the extent of cross-linking desired. To undergo this type of cross-linking reaction, the polymer must be one wherein some of the halogen containing units remain, preferably at least about 1% and more preferably about 5%. Both the cross-linked and the uncross-linked polyether phosphinyls can be saponified, as was illustrated in the foregoing examples, to yield soluble uncross-linked salts containing

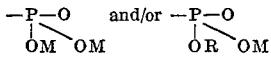

where M can be hydrogen, a Group I–A metal such as sodium, lithium, potassium, and cesium, a Group I–B metal such as copper and silver, a Group II–A metal such as calcium, magnesium, strontium and barium, a Group II–B metal such as zinc, cadmium and mercury, a Group III–A metal such as aluminum, or an ammonium cation such as $NH_4+$, $NR''_4+$ where R'' is alkyl, etc. These salts can be hydrolyzed by mineral acids to produce the derivative where M is H. The latter can then be reacted with other salts to yield other metal derivatives.

When one of the cross-linked polyether phosphinyls is saponified, there is produced not only the polyether containing the —P(O)(OM)$_2$ group but also a polyether containing a hydroxyl group in a side chain, e.g.

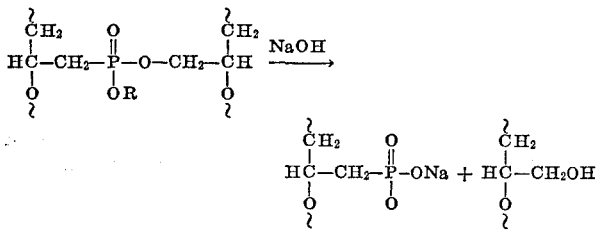

Thus there is provided a method of introducing a reactive hydroxyl into a polyether side chain. Such a polymer could contain in addition to the hydroxyl side chain, side chains containing the phosphonic acid and/or salt groups as well as some of the original halogen-containing side chains which did not react with the phosphite. These polar groups contribute properties such as adhesion, oil resistance, flame resistance, and other valuable properties, to the polyether. Polymers having large amounts of the phosphonic acid salt groups are useful as corrosion inhibitors, detergent additives, flotation agents, emulsifiers, protective colloids, dispersants, or flocculants, as semipermeable membranes for desalting water, oil well drilling mud additives, friction reduction additives, etc. Polymers containing, either or both phosphonate ester and salt groups will be useful for coatings applied to metal, glass, textiles, paper, wood, etc. by evaporation, electrodeposition, etc., as well as for molded articles, vulcanized rubbers, foams, fibers and films, binders for textiles, paper and nonwovens generally with improved flame resistance, strength properties, etc. The phosphonate ester and salt groups can be advantageously utilized to form cross-linked networks, via covalent or ionic cross-links, by reaction with polyfunctional reactive additives such as di- and polyamines, di- and polyvalent metals, etc.

Those polyethers prepared by reaction of the aliphatic halogen in the side chain with cyclic phosphites, either mono- or bicyclic phosphites, will, as explained above, have a haloalkoxy group attached to the phosphorus. This halogen provides basis for adding on more phosphinyl groups, according to the reaction

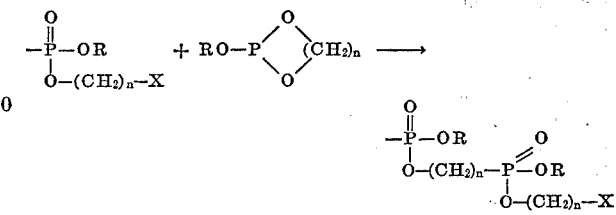

etc. The length of such side chains will vary depending on the relative reactivity of the polymer halogen to that of the haloalkoxy groups and will usually contain from 1 to 10 or more such units. These products are especially useful since the halogen is retained in the polymer and they are then especially effective flame retardants. In addition, those polymers containing more than one phosphinyl unit in the side chain are graft polymers having enhanced surface active behavior.

In many applications, it will be desirable to add to the polyethers containing phosphonate groups, such additives as reinforcing and nonreinforcing fillers, stabilizers, antioxidants, acid acceptors, corrosion inhibitors, cross-linking agents or promoters, plasticizers, etc.

The new polyethers of this invention that contain both haloalkyl and phosphinyl groups are valuable flame retardants for use in readily flammable plastic materials. Of particular importance, as flame retardant agents for polypropylene, are those polyethers that contain bromoalkyl and phosphinyl groups, as, for example, those produced by reacting a poly(epibromohydrin) with a trialkyl phosphite. When such a polyether is incorporated in polypropylene in an amount of at least about 3% of the total composition, the resulting composition meets the requirements of ASTM D–635 and has a combustion index of at least 0.21, measured according to the method of C. P. Fenimore and F. C. Martin, "Combustion and Flame," 10, 135 (1966). Thus, it is possible to convert polypropylene to a flame retardant composition with relatively low amounts of the flame retardant agent. In fact these bromomethyl, phosphinyl containing polyethers avoid the necessity of using other flame retardants which are commonly used, such as antimony oxide, bismuth sulfide, etc., which surprisingly contribute nothing to the flammability retardance of this type of composition. Because of the small amount of flame retardant constituents required, the compositions have improved physical properties, such as for example, greater impact strength, higher flexural strength, higher tensile strength and decreased opacity as compared to most flame retardant polypropylene compositions.

The following examples illustrate the use of the haloalkyl and phosphinyl containing polyethers of this invention as flame retardants for polypropylene.

EXAMPLES 21–25

In these examples the dimethoxyphosphinyl- and diisopropoxy phosphinyl-containing polyethers produced in Examples 1, 3, 20, 6 and 14 were tested, respectively, as flame retardants in polypropylene. The polypropylene used was a commercial stereoregular polypropylene having a melt index of 4, and an RSV (determined on a 0.1% solution in decahydronaphthalene at 135° C.) of 2.9. The polyether was slurried and/or dissolved in acetone and then wet mixed with the polypropylene flake and the solvent then removed. Molding compositions were made by intimately blending stereoregular polypropylene with the flame retardant(s) on a two-roll mill at 175° C. for 10 minutes and these were then compression molded into ⅛ inch plaques using a 4,000 p.s.i.g. press at 235° C. for 5 minutes. Antimony trioxide, when present, was in finely divided form and passed a U.S. Standard Sieve No. 200.

Details as to the amount of each component in the compositions and flame retardancy test results on the molded plaques made therefrom are given in the following table.

TABLE

| Ex. No. | Composition (parts by weight) | | | | Flame retardancy | |
|---|---|---|---|---|---|---|
| | Polypropylene | Product of— | Parts | Antimony trioxide | Combustion index | Rating (ASTM D-635) |
| Control A | 100 | | | | 0.178 | Burning. |
| 21 | 96.7 | Ex. 1 | 3.2 | | 0.211 | Self-extinguishing. |
| 22 | 94 | Ex. 3 | 6 | | 0.224 | Do. |
| 23a | 94 | Ex. 20 | 6 | | 0.226 | Do. |
| 23b | 90 | Ex. 20 | 6 | 4 | 0.224 | Do. |
| 24 | 95.7 | Ex. 6 | 4.3 | | 0.213 | Do. |
| 25 | 95.3 | Ex. 14 | 4.7 | | 0.216 | Do. |

What I claim and desire to protect by Letters Patent is:

1. A polyether wherein from 0 to 99.5% of the repeating units are ether units obtained by ring-opening polymerization of an aliphatic halogen-containing vicinal monoepoxide, from 0 to 99.5% of the repeating units are ether units obtained by ring-opening polymerization of at least one other cyclic oxide selected from the group consisting of oxiranes, oxetanes and tetrahydrofurans, and from 0.5 to 100% of the repeating units have a phosphinyl group attached to an aliphatic carbon of ether units obtained by ring-opening polymerization of a vicinal monoepoxide, said phosphinyl group having the formula $$-\overset{O}{\underset{\|}{P}}-(R')_x(OR)_{2-x}$$

where $x$ is 0 to 2, $R'$ is a hydrocarbyl radical, and when $x$ is 1, each R is a hydrocarbyl radical, and when $x$ is zero, each R is selected from the group of hydrogen, a metal cation of Groups I-A, I-B, II-A, II-B, or III-A of the Periodic Table, an ammonium cation, a hydrocarbyl radical or a halo-substituted hydrocarbyl group, or the two R's taken together are alkylene, or haloalkylalkylene, said polyether having a weight average molecular weight of at least about 50,000.

2. The polyether of claim 1 wherein the aliphatic halogen-containing epoxide monomer units are epihalohydrin units.

3. The polyether of claim 2 wherein from 0 to 99.5% of the repeating units are epibromohydrin units and from 0.5 to 100% of the repeating units have the formula

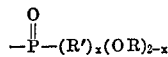

where R is as defined in claim 1.

4. The polyether of claim 2 wherein from 0 to 99.5% of the repeating units are epichlorohydrin units and from 0.5 to 100% of the repeating units have the formula

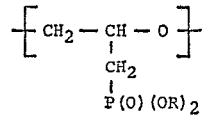

where R is as defined in claim 1.

5. The polyether of claim 3 where R is methyl.
6. The polyether of claim 4 where R is methyl.
7. The polyether of claim 3 where R is isopropyl.
8. The polyether of claim 4 where R is isopropyl.
9. The polyether of claim 3 where R is sodium.

10. The polyether of claim 2 wherein from 0 to 99.5% of the repeating units are epibromohydrin units and from 0.5 to 100% of the repeating units have the formula

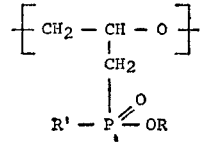

where R and R' are each a hydrocarbyl radical.

11. The polyether of claim 2 wherein from 0 to 99.5% of the repeating units are epibromohydrin units and from 0.5 to 100% of the repeating units have the formula

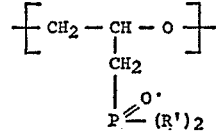

where each R' is a hydrocarbyl radical.

References Cited

UNITED STATES PATENTS

| 2,856,369 | 10/1958 | Smith et al. | 260—2 |
| 3,317,638 | 5/1967 | Hartman et al. | 260—978 |
| 3,341,475 | 9/1967 | Vandenberg | 260—2 |
| 3,417,036 | 12/1968 | Vandenberg | 260—2 |

WILLIAM H. SHORT, Primary Examiner

E. A. NIELSEN, Assistant Examiner

U.S. Cl. X.R.

117—161 R; 210—54; 252—388; 260—2 D, 2 XA, 2 P, 29.2 EP, 45.7 P, 897 C, 897 R, 926

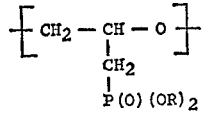

where R is as defined in claim 1.